INVENTOR.
VICTOR ZATZ
BY BLUM, MOSCOVITZ, FRIEDMAN
BLUM and KAPLAN.
ATTORNEYS

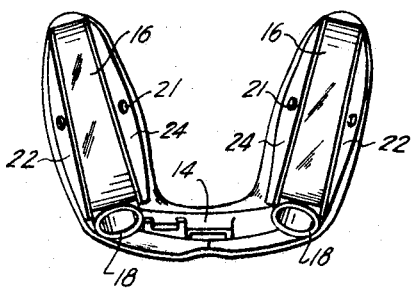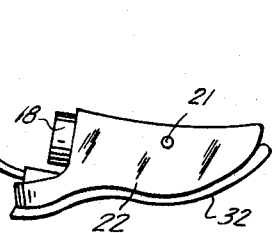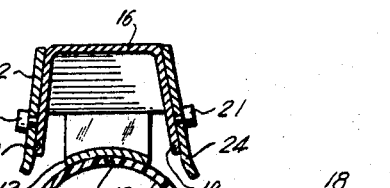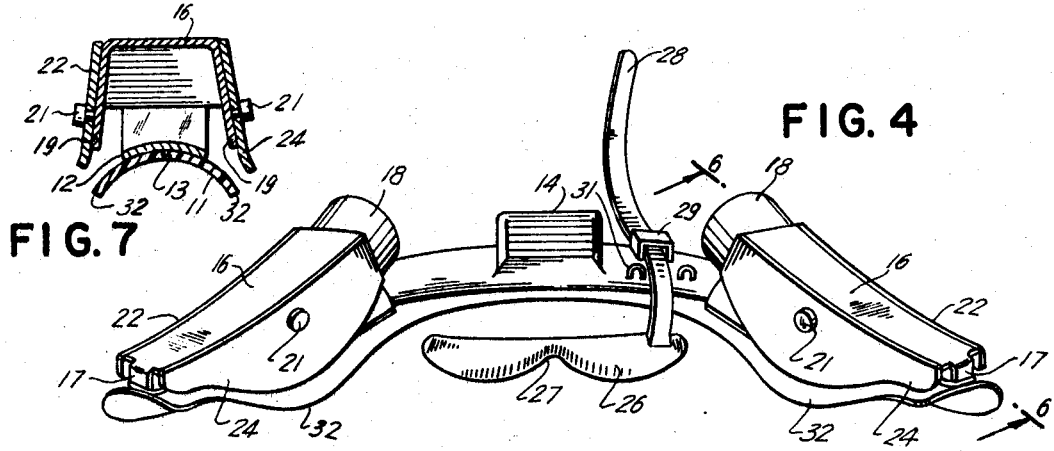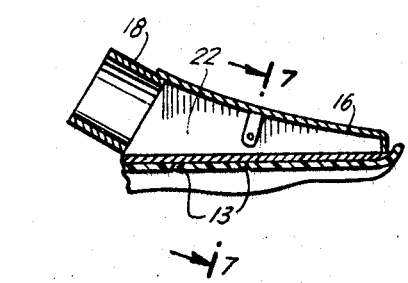

INVENTOR.
VICTOR ZATZ

July 2, 1968 V. ZATZ 3,390,457
METHOD AND APPARATUS FOR MAKING AN EDENTULOUS IMPRESSION
Filed Feb. 12, 1965 4 Sheets-Sheet 4
FIG. 9
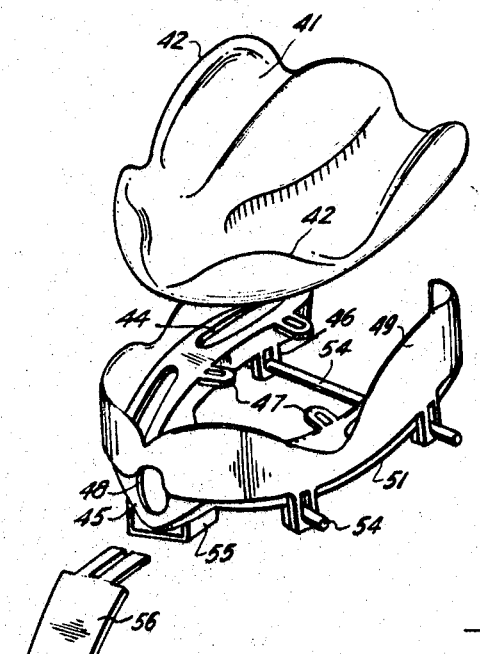
FIG. 10
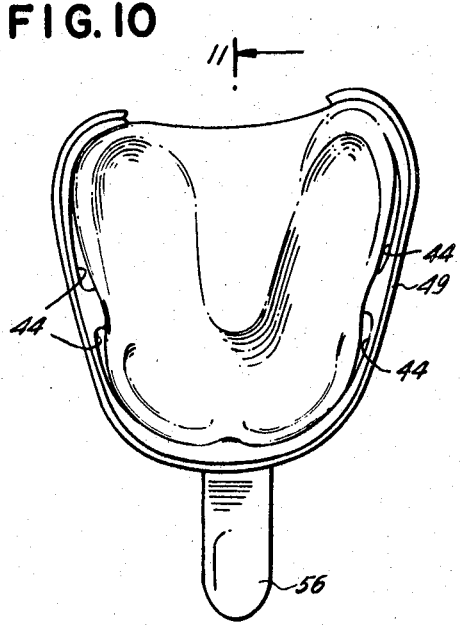
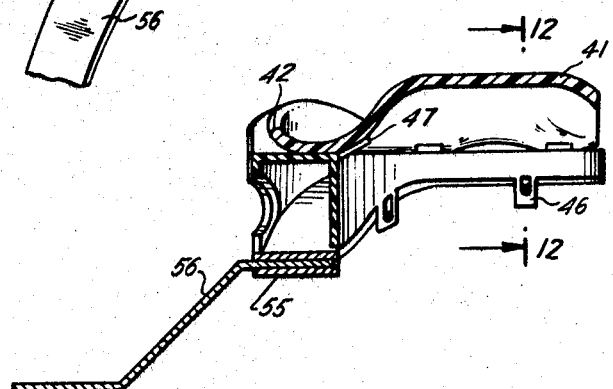
FIG. 11
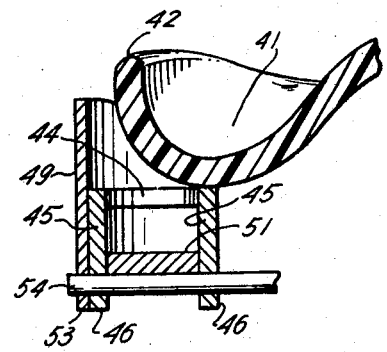
FIG. 12
INVENTOR.
VICTOR ZATZ
BY
Blum, Moscovitz, Friedman
Blum & Kaplan,
ATTORNEYS

United States Patent Office 3,390,457
Patented July 2, 1968

3,390,457
METHOD AND APPARATUS FOR MAKING AN EDENTULOUS IMPRESSION
Victor Zatz, 570 Westminster Road,
Brooklyn, N.Y. 11230
Filed Feb. 12, 1965, Ser. No. 432,148
10 Claims. (Cl. 32—17)

ABSTRACT OF THE DISCLOSURE

A method of taking an edentulous impression and apparatus therefor in which a base impression of an edentulous ridge is prepared with the borders trimmed underextended. The apparatus is attached to the prepared base and impression material is injected through the apparatus and flowed about the base to fill the borders to complete the edentulous impression.

---

This invention relates generally to a method and apparatus for making edentulous impressions and is more particularly directed to an improved method and a novel apparatus whereby an edentulous impression having properly and accurately developed border extensions may be taken.

While the art of making full dentures and taking impressions therefor has been in practice for some time, it is an admitted fact that a great number of dentures leave a great deal to be desired with regard to stability and retention. This is primarily due to the improper development of the border extensions due to lack of knowledge with respect to the termination of the borders.

The difficulties heretofore experienced in correctly defining and terminating both upper and lower impression borders is amply demonstrated by the substantially large number of unsatisfactory or improperly fitted dentures in current use.

Accordingly, it is an object of this invention to provide a method for taking an edentulous impression whereby the borders may be accurately developed.

Another object of the invention is to provide an apparatus which can be used for deveolping the borders of the impression and which can assure accuracy of formation with minimum skill and care.

Still other objects and advantages of the invention will in part be obvious and will in part be apparent from the specification.

Generally speaking, in accordance with the invention, an initial impression using known methods is taken of an edentulous ridge, a stone cast is poured on which a wax denture base is formed. The wax base is processed by known methods to create a plastic denture base. Thereafter, the borders of this base are trimmed shorter, to be underextended. The base is subsequently attached to an apparatus or fixture of suitable size and the base and apparatus is engaged with the edentulous ridge in the patient's mouth whereafter suitable plastic impression material is forced through the apparatus and flowed around the underextended base and into the border portions of the patient's mouth to accurately develop the borders only and relate them to the previously formed underextended base.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the invention, reference is had to the following description taken in connection with the accompanying drawings, in which:

FIG. 2 is a top plan view of the apparatus of FIG. 1 in an assembled position;

FIG. 3 is a front elevational perspective view of the apparatus shown in FIG. 2;

FIG. 4 is a rear elevational perspective view of the apparatus of FIG. 2, the apparatus incorporating a tongue orienting element;

FIG. 5 is a side elevational view of the apparatus of FIG. 4;

FIG. 6 is a sectional view taken along line 6—6 of FIG. 4;

FIG. 7 is a sectional view taken along line 7—7 of FIG. 6;

FIG. 9 is a partly assembled perspective view of the embodiment of FIG. 8;

FIG. 10 is a top plan view of the device of FIG. 9;

FIG. 11 is a sectional view taken along line 11—11 of FIG. 10; and

FIG. 12 is a partial sectional view taken along line 12—12 of FIG. 11.

Figure 1:
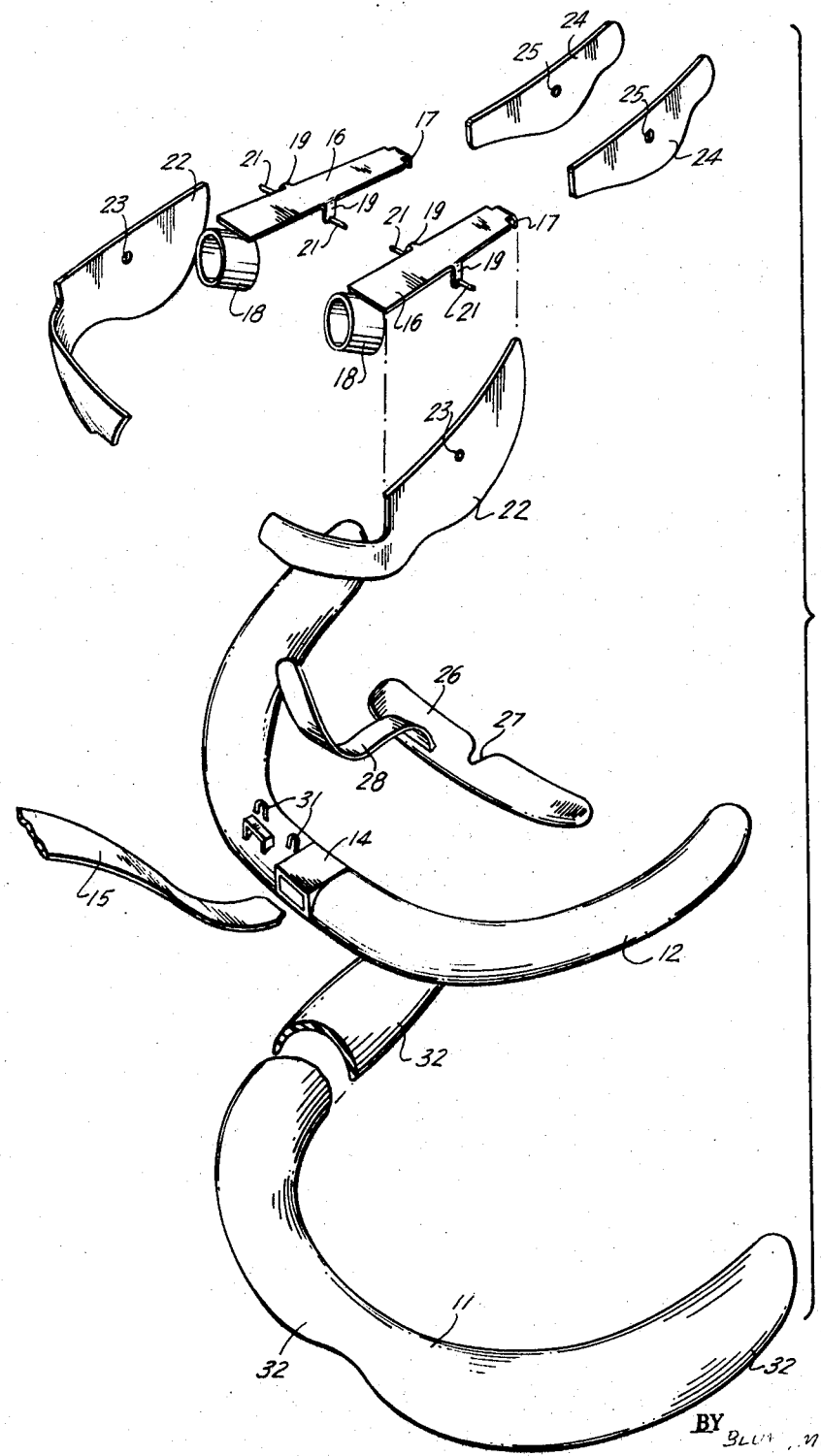
FIG. 1 is an exploded perspective view of an apparatus for developing of the borders of a lower edentulous impression in accordance with the teachings of the instant invention.

Referring now to the drawings, the apparatus for completing the borders of the lower impressions is shown in FIGS. 1 through 6 and will now be described in greater detail.

A previously processed plastic base 11 is prepared using known dental techniques. This base represents the completed impression of the seating area of the lower ridge, the borders of the base having been trimmed underextended. The base is adapted for mounting to the apparatus provided for the development of the borders of the lower ridge. A main plate 12 which generally follows the outline of the ridge is provided with depending posts 13 which hold the base to the main plate by cooperation between the posts and the base.

A slotted handle receiving member or box 14 is secured to the top surface of plate 12 centrally thereof and is adapted to receive a handle 15 through which the apparatus may be lifted and oriented. A pair of top cover plates 16 each having a depending rear flange 17 and a depending front tube 18 are secured through the lowermost edges of rear flanges 17 and front tubes 18 to the top of plate 12 so that the top cover plates are secured in spaced relation with respect to plate 12. Securing may be accomplished by welding, soldering or any other suitable means. Central supports 19 depend from the longitudinal edges of top cover plate 16 and extend toward but are spaced from plate 12. Central supports 19 carry rivets 21 or any other suitable fastening members. A pair of outer cover plates 22 generally follow the curvature of plate 12 with widened main portions and a narrow end portion adapted to meet at the approximate center of plate 12 as best shown in FIGS. 2 and 3. Each outer cover plate 22 is provided with an aperture 23 through which a cooperating rivet 21 extends in the assembled position. A pair of inner cover plates 24 also provided with apertures 25 are adapted to be mounted to top cover plates 16 through cooperating rivets 21. The relative orientation of the elements in the assembled position is best shown in FIG. 7 wherein a top cover plate 16 has secured thereto along one edge thereof an outer cover plate 22 and an inner cover plate 24 with the inner and outer cover plates being secured to the top cover plate through rivets 21. From FIG. 7, it is to be seen that the inner and outer cover plates extend downwardly toward plate 12 and base 11 but the edges thereof are substantially spaced from plate 12 and base 11 for purposes to be subsequently described.

A tongue control plate 26 having a central cutout portion 27 and a manipulating handle 28 is provided for control of the tongue during the developing of the sublingual extension on the floor of the mouth. A channel member 29 is secured to plate 12 and is adapted to receive and orient manipulating handle 28. Ligating hooks 31 may also be secured to plate 12 to assist in locking the tongue control plate in position while the impression is being taken.

An initial impression is made utilizing known techniques. The impression includes all borders. A stone cast is poured on which a wax base is prepared. This wax base is then processed in plastic. The borders or edges of the plastic base, indicated at 32 on the drawings, are trimmed shorter, underextended, in order to be rebuilt in accordance with the invention. The base is attached to plate 12 by engagement of the base with posts 13. The fully assembled apparatus or support device with the base attached to plate 12 is inserted in the patient's mouth with the base seating on the lower ridge. By means of an injecting device (not shown) impression material is injected into a space above plate 12 through front tubes 18 and the soft material flows into the cavities defined by the cover plates and through the openings defined by the lower edges of the cover plates along the outside surface of base 11 and into the border areas of the mouth to form a bead-like member and properly and accurately fill the borders to complete an impression thereof. The cover plates guide the impression material to the labeal and buccal folds and to the lingual floor of the mouth. The patient performs the functional movement of the oral tissues and muscle attachments thereby developing functionally accurate impression borders. This can be easily and accurately accomplished in only a few minutes with complete control.

As ridge sizes vary from patient to patient, within limits, various sizes of apparatus will be provided and, when attaching the base to the apparatus, the dentist will select an apparatus which provides a clearance of approximately 2 mm. for flow of the impression material.

The creation of a stable and retentive lower denture presents considerable problems due to the limitations of the seating area of the lower ridge. Therefore, the utilization of a sublingual extension is of paramount importance. Known methods for creating sublingual extensions are generally so inadequate that most dentists omit the development of the sublingual extension. However, with the apparatus and method of the instant invention, a sublingual extension can be easily and accurately developed. When the apparatus with the base secured thereto is inserted in the patient's mouth, tongue control plate 26 is inserted under the tongue with cutout portion 27 touching the lingual frenum under the tongue. The patient then positions the tongue in its usual nonfunctional position and the manipulation handle 28 is secured in position with respect to plate 12 by means of ligating wires through ligating hooks 31 and/or plaster or compound material which is chilled to lock the tongue control plate in position. Prior to injection of the impression material to develop the borders, the apparatus is removed and impression material is placed on the undersurface of tongue control plate 26. The apparatus is replaced in the mouth and a nonfunctional impression of the sublingual extension is taken. When the impression material has hardened, the apparatus is removed and any surplus impression material is trimmed flush with the contours of the control plate. Thereafter, the apparatus is replaced and reseated and the impression material is introduced into the cavities in the main portion of the apparatus to develop all borders. The material flowing into the lingual borders also joins with the impression material of the sublingual extension thereby completing an edentulous impression having a sublingual extension. Once the completed impression has hardened, the apparatus is removed and a stone cast is poured. Thereafter, known methods are used to construct the ultimate denture. Once the cast of the impression has been made, the impression material may be stripped from the apparatus and the apparatus disassembled and cleaned for subsequent use.

Figure 8:
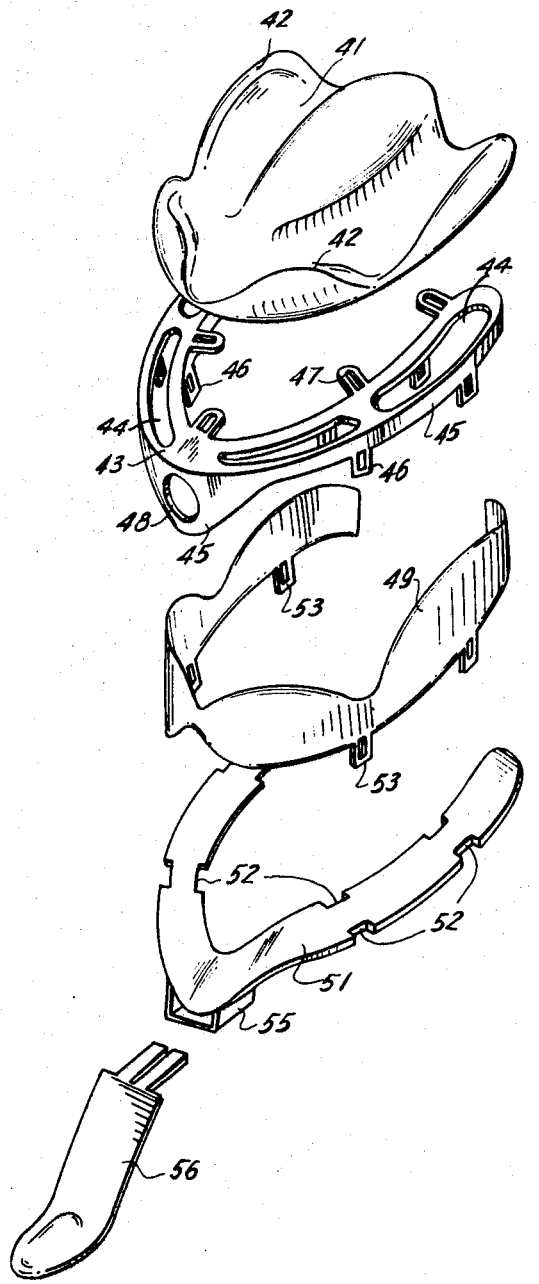
FIG. 8 is an exploded perspective view of an apparatus constructed in accordance with the invention for developing the borders of an upper impression.

The method of developing the upper impression is substantially identical to the method heretofore described in connection with the lower impression. However, as will readily be understood, the apparatus for supporting the base and guiding the impression material is necessarily of a different configuration and will now be described with reference to FIGS. 8 through 12.

The upper ridge has only labeal and buccal borders because of the continuous surface of the palate. A plastic base 41 is prepared using known techniques and its borders 42 are trimmed underextended. A main plate 43 for mounting base 41 generally follows the upper ridge line and is provided with a series of elongated apertures 44 through which impression material will flow as will be subsequently described. Plate 43 is formed with depending flanges 45 along the periphery thereof with lock tabs 46 extending from the flanges. Posts 47 extend inwardly and upwardly from the inner edge of plate 43 and are adapted to engage and firmly hold base 41 when the base is attached to the plate. The front central portion of flange 45 is provided with an aperture 48 through which impression material will be injected.

A continuous side plate 49 is adapted to envelop the outer edge of plate 43 and extend upwardly with respect thereto as best shown in FIGS. 9, 11 and 12. Plate 43 and continuous side plate 49 are selected with relation to the size of base 41 so that side plate 49 is spaced from the base in order to provide a passage for the impression material. A bottom cover 51 is provided having edges following the outline of flanges 45 with cutout portions 52 for receiving depending lock tabs 46. Lock tabs 53 also depend from continuous side plates 49 and the plate 43, bottom cover 51 and continuous side plates 49 are assembled as shown in FIGS. 9 and 12 with rods 54 passing through apertures in the lock tabs and beneath bottom cover 51 to secure the elements in the assembled position.

As shown in FIG. 12 bottom cover 51 is secured to plate 43 in contact with flanges 45 so that the bottom cover is spaced from the plate thereby defining a passage for the impression material which is injected into the passage through aperture 48. Apertures 44 in the plate allow the injected impression material to flow upwardly along the surface of base 41 and into the borders to develop all borders. Bottom cover 51 may be provided with a handle receiving member 55 for removably supporting a handle 56 through which the apparatus may be manipulated.

The apparatus or support device shown in FIGS. 8 through 12 is used to complete all of the impression borders. As previously described, the base is initially formed using known techniques and trimmed underextended. The base is mounted securely to apparatus of suitable size and the base and apparatus are inserted into the patient's mouth with the base in place in the seating area. Impression material is injected into the apparatus through aperture 48 and the material flows through the apparatus and, as a head-like member, around the base into the borders. Once the impression material has set, the apparatus is removed from the patient's mouth and a stone cast is poured. Thereafter, the ultimate denture is constructed using known methods. Once the impression is no longer needed, it can be removed from the apparatus and the apparatus disassembled and cleaned for subsequent use.

The substantial advance in the art made by the instant invention is primarily with respect to the creation of functionally correct impression borders which result in the accuracy of the borders of the ultimate denture. The disclosed apparatus permits of rapid and accurate impression taking in accordance with the disclosed method but, it should be understood that any variety of configurations of apparatus defining chambers for flowing of the impression material can be used. Thus, there is disclosed preferred embodiments of apparatus for taking upper and lower impressions but the invention is in no way limited to the specifically disclosed preferred embodiments.

It will thus be seen that the objects set forth above, among those made apparent from the preceding description, are efficiently attained and, since certain changes may be made in carrying out the above methods and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method of taking an edentulous impression comprising preparing a base impression of an edentulous ridge, trimming the borders of said base underextended, attaching said base to a support device with border portions of said base spaced from said support device, placing said base and support device assembly on the edentulous ridge, injecting impression material into said support device and causing said impression material to flow through said support device and along portions of said base, whereby to fill the borders to complete the edentulous impression.

2. A method of taking an edentulous impression of a lower ridge comprising preparing a base impression of an edentulous ridge, trimming the borders of said base underextended, attaching said base to a support device with border portions of said base spaced from said support device, placing said base and support device assembly on the edentulous ridge, placing a tongue control plate beneath the tongue and securing it to said support device in nonmovable relation, removing said support device, tongue control plate and base assembly from the edentulous ridge, coating the undersurface of said tongue control plate with impression material, placing said tongue control plate, support device and base assembly on the edentulous ridge with the tongue control plate beneath the tongue, whereby to form an impression of a sublingual extension and injecting impression material into said support device and causing said impression material to flow through said support device, along portions of said base, and into contact with the sublingual extension impression material, whereby to fill the borders and join the sublingual extension to complete the edentulous impression.

3. In combination, a support member, means for securing said support member to the exposed surface of a previously prepared denture base, a chamber defining device mounted on said support member, said device having means for receiving a plastic material as from an injection device or the like, and flanges extending from said device at each side of said support member conforming generally to the shape of the peripheral edges of said support members and the previously prepared base while spaced therefrom, said flanges terminating in spaced relation relative to the sides of said support member and the base when secured to said support member whereby to guide the flow of plastic outwardly between the flanges, the support member and the base toward the borders of the mouth, whereby to form the bead-like member of said plastic material conforming simultaneously to the sides of the base and the borders.

4. In combination, a support member having the general shape of the ridge portion of the exposed surface of a previously prepared denture base, means for securing said support member to the exposed surface of the denture base, a chamber defining device mounted on said support member, said device having means for receiving a plastic material as from an injection device or the like, and flanges extending from said device at each side of said support member conforming generally to the shape of the peripheral edges of said support member and the previously prepared base while spaced therefrom, said flanges terminating in spaced relation relative to the sides of said support member and the base when secured to said support member whereby to guide the flow of plastic outwardly between the flanges, the support member and the base toward the borders of the mouth, whereby to form a bead-like member of said plastic material conforming simultaneously to the sides of the base and the borders.

5. The structure as claimed in claim 4 and further including a tongue control plate, a manipulating handle extending from said tongue control plate and means mounted on said support member for guiding said manipulating handle and securing it with respect thereto.

6. An apparatus for developing the borders of an edentulous impression comprising a main plate having the general configuration of an edentulous ridge, means on said main plate to secure said main plate to a ridge impression base, a pair of top cover plates secured to said main plate in spaced relation with respect thereto, said top cover plates including tubes for injection of impression material into the space between said top cover plates and said main plate, and inner and outer cover plates secured to said top cover plate and extending toward said main plate, said inner and outer cover plates being spaced from said main plate to define a passage through which impression material may pass.

7. The structure defined in claim 6 and further including a handle receiving member secured to said main plate and a handle mountable in said handle receiving member for manipulation of said main plate.

8. The structure defined in claim 6 and further including a tongue control plate, a manipulating handle extending from said tongue control plate, and means on said main plate for guiding and securing said manipulating handle relative thereto.

9. Apparatus for developing the borders of an edentulous impression comprising a main plate having the general configuration of an edentulous ridge, means in said main plate to secure said main plate to a ridge impression base, a plurality of apertures through said main plate, flanges depending from the peripheral edges of said main plate, said flanges including means for injection of impression material into the channel defined by said main plate and said flanges, a bottom cover adapted to engage the edges of said flanges in spaced relation with respect to said main plate, a continuous side plate adapted to extend from said main plate along the outside peripheral edge thereof in a direction opposite to the direction of extension of said flanges, and means for securing together said main plate, said bottom cover and said continuous side plate.

10. A method of taking an edentulous impression comprising preparing a base impression of an edentulous ridge using conventional methods, trimming the borders of said base underextended, placing said base on the edentulous ridge, and applying impression material to said base with said impression material flowing along each side of said base and beyond the trimmed borders of said base to thereby complete the edentulous impression.

References Cited

UNITED STATES PATENTS

| | | | |
|---|---|---|---|
| 1,561,052 | 11/1925 | Brown | 32—17 |
| 2,452,866 | 11/1948 | Oertel | 32—17 |
| 2,458,145 | 1/1949 | Coffey | 32—17 |

RICHARD A. GAUDET, *Primary Examiner.*

R. L. FRINKS, *Examiner.*

J. W. HINEY, *Assistant Examiner.*